US006827262B2

(12) United States Patent
McClure et al.

(10) Patent No.: US 6,827,262 B2
(45) Date of Patent: Dec. 7, 2004

(54) PORTABLE VOTING BOOTH

(75) Inventors: Neil McClure, Longmont, CO (US); Charles Haisley, Longmont, CO (US); Torin Meyers, Thornton, CO (US); Jeff Gettle, Boulder, CO (US)

(73) Assignee: Hart InterCivic, Austin, TX (US)

(*) Notice: Subject to any disclaimer, the term of this patent is extended or adjusted under 35 U.S.C. 154(b) by 0 days.

(21) Appl. No.: 10/215,124

(22) Filed: Aug. 8, 2002

(65) Prior Publication Data

US 2004/0056093 A1 Mar. 25, 2004

(51) Int. Cl.[7] .................................... G06F 17/60
(52) U.S. Cl. .................................... 235/386; 705/12
(58) Field of Search .................... 235/386, 51, 50 B, 235/54 A, 54 F, 55 A, 55 E; 705/12, 26

(56) References Cited

U.S. PATENT DOCUMENTS

| | | | | | |
|---|---|---|---|---|---|
| 3,620,587 | A | * | 11/1971 | Ahmann | 312/203 |
| 4,445,731 | A | * | 5/1984 | Ahmann | 312/258 |
| 4,451,728 | A | * | 5/1984 | McKay et al. | 235/50 R |
| 4,510,378 | A | * | 4/1985 | Dolson | 235/50 R |
| 4,649,264 | A | * | 3/1987 | Carson | 235/54 R |
| 4,660,904 | A | * | 4/1987 | Stephens | 312/140.2 |
| 4,712,757 | A | * | 12/1987 | Ahmann | 248/188 |
| 4,854,652 | A | * | 8/1989 | Ahmann | 312/140.2 |
| 5,666,765 | A | * | 9/1997 | Sarner et al. | 52/36.1 |
| 6,151,816 | A | * | 11/2000 | Bagley | 38/102.21 |

* cited by examiner

*Primary Examiner*—Thien M. Le
*Assistant Examiner*—Edwyn Labaze
(74) *Attorney, Agent, or Firm*—Dan Cleveland, Jr.; Lathrop & Gage L.C.

(57) ABSTRACT

A portable voting booth may be placed into a closed configuration for transportation and storage where a bivalve case closes to seal an electronic voting device

13 Claims, 3 Drawing Sheets

PORTABLE VOTING BOOTH

BACKGROUND OF THE INVENTION

1. Field of the Invention

The present invention pertains to the field of voting booths and, more particularly to portable voting booths that may be assembled at polling places for use during elections. Still more specifically, the voting booths may be placed into a case for ease of transport and storage.

2. Description of the Related Art

Portable voting booths are used to equip polling places, such as public schools, with voting devices on a temporary basis. Portable voting booths should not be so heavy that a single person has difficulty lifting the equipment, and it is desirable that the booths can be folded into a compact, stackable structure for transportation and storage. A portable voting booth structure is shown in U.S. Pat. No. 5,666,7565 to Sarner et al, which describes a booth with a folding leg assembly that facilitates frontal access by handicapped persons. Frontal access of the type generally disclosed, or other accommodations, are generally required by law to permit persons who use wheelchairs equal access to the voting equipment. A case assembly has a tripartite bivalve construction that is required to hide the folding legs when the legs are folded for storage. This structure is required to protect and hide the folding legs, adding weight and complexity to the overall system.

U.S. Pat. No. 4,641,240 to Boram shows a voting station that has no legs; however, the structure is required to extraordinarily large and bulky due to a square frame support that contacts the ground. Frontal access by disable persons is made difficult or impossible because the support frame blocks such access. U.S. Pat. No. 5,275,365 to Gerbel et al. is similarly disadvantaged due to deployment of a collapsible table height machine having an A-frame wheel base that prevents frontal access by wheel-chair bound persons.

U.S. Pat. No. 4,660,904 to Stephens describes a portable voting booth or lectern that may be disassembled into various components; however, there is no system for controlling the respective disassembled components for transportation or storage. Thus, the respective components are easily lost or damaged.

SUMMARY

The present voting booth overcomes the problems outlined above and advances the art by providing a compact portable voting booth that occupies an exceptionally small volume and has an unusually light weight. The potable voting booth advantageously has an open front that facilitates access by persons who use wheelchairs.

According to the various embodiments and instrumentalities of the invention, the portable voting booth comprises a bivalve case that includes a lower shell having an electronic voting device mounted thereon, an upper shell, and a coupler such as a hinge connecting the upper shell to the lower shell. The coupler permits pivotal motion of the upper and lower shells with respect to one another between an open configuration and a closed configuration. A pair of privacy screens are selectively positionable between the upper shell and the lower shell to impede unauthorized viewing of the electronic voting device from side perspectives during voting process. A selectively disassemblable frame is coupled with the lower shell to support the same at an angle that facilitates authorized viewing of the electronic voting device during the course of voting processes. Receptacles are formed in at least one of the upper shell and the lower shell have complimentary shapes with respect to disassembled components of the selectively disassemblable frame. The receptacles permit retention of the frame components during transportation and storage of the portable voting booth.

In preferred but optional embodiments, the upper shell and lower shell, when pivoted to meet one another in the closed configuration with the privacy screens removed from their positions of normal use, form an internal compartment having sufficient dimensions to retain the electronic voting device and the privacy screens. The bivalve case may comprise a lock mechanism opposite the coupler to prevent unauthorized access to the electronic voting device when the bivalve case is in the closed configuration. The lower shell may, for example, comprise a buss for coupling the electronic voting device to a network.

The frame may comprise a plurality of tubular members that coupled to one another by telescoping clip latches. The receptacles may also function to accommodate corresponding portions of the tubular members and support the lower shell at the angle by virtue of contact with the corresponding portions. A foot bracket may receive two generally upright members forming a triangle with the lower shell and a forward extending horizontal member that imparts stability against tipping by virtue of contact against the ground.

In use, the bivalve case is opened from a closed configuration, and the privacy screens are pivoted into a position of normal operation. Disassembled components of the selectively disassemblable frame are detached from the receptacles that are formed, for example, in the lower shell of the bivalve case. The disassembled components are assembled into a working frame assembly, and voting operations are able to commence with use of the portable voting booth. The lightweight, simple construction facilitates ease of handling, as well as rapid setup and disassembly.

Additional features, objects, and advantages of the portable voting booth will be apparent to those skilled in the art upon reading the following specification and the accompanying drawings.

DETAILED DESCRIPTION

Figure 1:
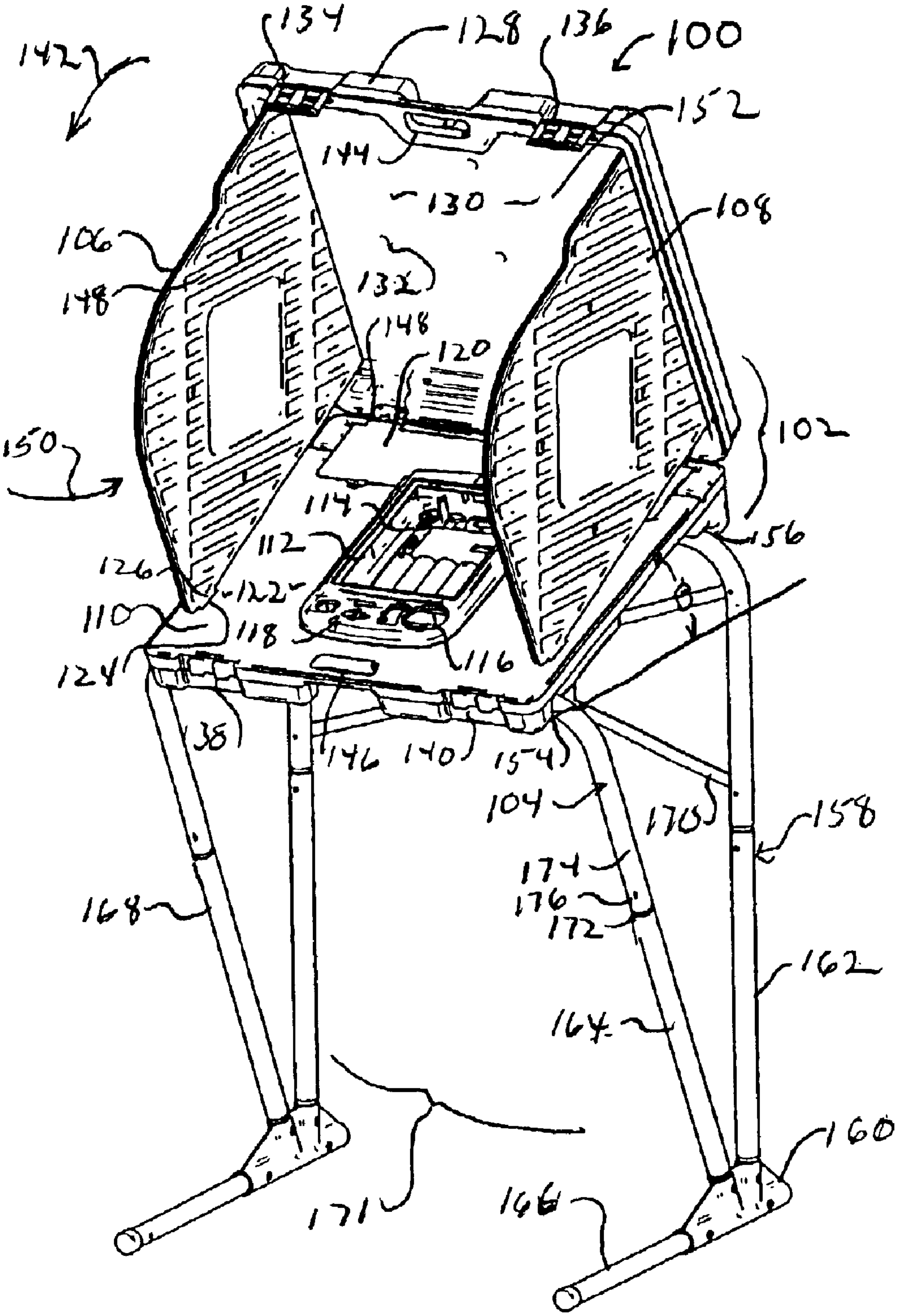
FIG. 1 is a top, right front perspective view of the portable voting booth.

There will now be shown and described, in FIG. 1 according to the various instrumentalities and embodiments described herein, a portable voting booth 100 having a bivalve case 102 in an open configuration, a selectively disassemblable frame 104 in assembled configuration, and a pair of privacy screens 106 and 108 that are positioned for normal use where they impede unauthorized side perspective viewing of voting operations.

The bivalve case 102 includes a lower shell 110 having an electronic voting device 112. The electronic voting device may be any such device that permits a voter to cast votes during the course of an election, such as an eSlate™ system provided by Hart InterCivic of Austin, Tex. Preferred but optional component of the electronic voting device include a visual display 114, a rotary input device 116, various buttons 118 that may be programmed to facilitate voter interaction, and network buss interfaces (not shown in FIG. 1). Access to hidden interior electrical components, such as batteries, cards, or wiring, may be obtained by opening hatch 120. Surface 122 contains slots, such as slot 124, for supportively engaging complimentary supportive structure 126 on privacy screen 106.

An upper shell 128 presents interior surface 130 with clip structures 132 that may be used to retain a paper ballot (not shown in FIG. 1). Forward flex-latch mechanisms 134, 136 engage bosses 138, 140 when the upper shell 128 is pivoted forward in the direction of arrow 142 to place the bivalve case 102 in a closed configuration where handle components 144, 146 meet to form a single handle. A coupler, such as hinge 148 as shown in FIG. 1, permits this pivoting motion in the direction of arrow 142. A lock, such as a key or combination lock, (not shown in FIG. 1) may be provided between handle components 144, 146 to require authorized access and prevent tampering with the electronic voting device 112.

The privacy screens 106, 108 are textured with ribbed surfaces 148 that add rigidity and diminish the appearance and effect of scratches that may arise from use of the portable voting booth 100. The privacy screens 106, 108 are selectively positionable in the sense that, for example, structure 126 may be lifted from slot 124 and screen 106 may then be pivoted inwardly in the direction of arrow 150 to fold against surface 130 for receipt within an interior compartment 152 prior to placing the bivalve case 102 into a closed configuration. The portion of privacy screen 106 adjacent surface 130 has upper and lower protruding nibs (not shown in FIG. 1) that engage complimentary receptacle structure on surface 130 to permit pivoting motion according to arrow 150.

The selectively disassemblable frame 104 is coupled with the lower shell 110 at complimentary receptacles, such as receptacles 154, 156, to support the lower shell 110 at an angle β that facilitates authorized viewing of the electronic voting device during the course of voting processes. As shown in FIG. 1, angle β is a rearwardly ascending angle that preferably ranges between 15° and 30°.

A right leg assembly 158 includes a foot bracket 160 that receives tubular members 162 and 164 to form a generally upright triangle with the lower shell 110. A forwardly tilted hypotenuse of this triangle including member 164 pitches the weight of the portable voting booth 100 forward for ultimate support against a horizontal tubular member 166 that is also received in foot 160. A left leg assembly 168 is a mirror image of the right leg assembly 158. A rearward brace assembly 170 stiffens the frame 104 and enhances lateral stability between the right and left leg assemblies 158, 168.

Figure 2:
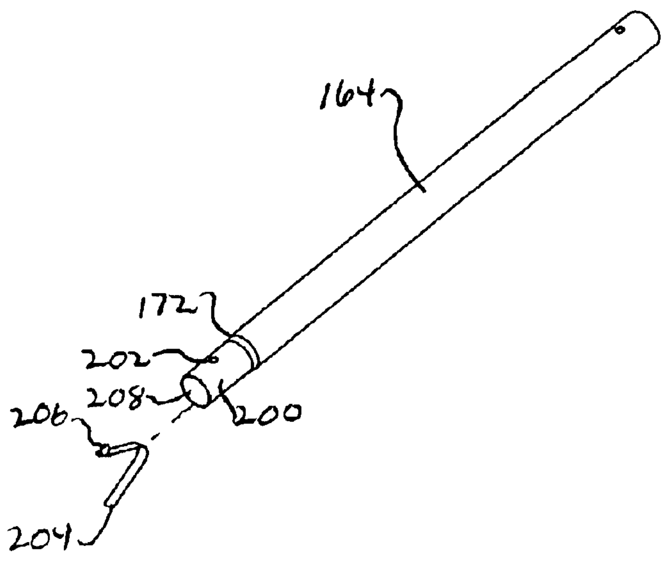
FIG. 2 is an assembly view of a tubular member that may be used in a support frame for the portable voting booth.

FIG. 2 is an assembly view of tubular member 164, which provides additional detail with respect to a telescoping interfit between tubular members wherever the respective tubular members interface, such as at interface 172. Member 164 has a reduced diameter neck 200 with an aperture 202. A leaf spring 204 with button clip 206 passes into a tubular opening 208 until the button 206 resides in aperture 202, which retains the leaf spring 204 within opening 208. Other tubular members, such as a right-angle angle bend member 174, have openings capable of telescopically receiving neck 200 up to interface 172, which forms an abutment. Aperture 202 accommodates button 206 to lock the interface 172 into an assembled configuration.

Figure 3:
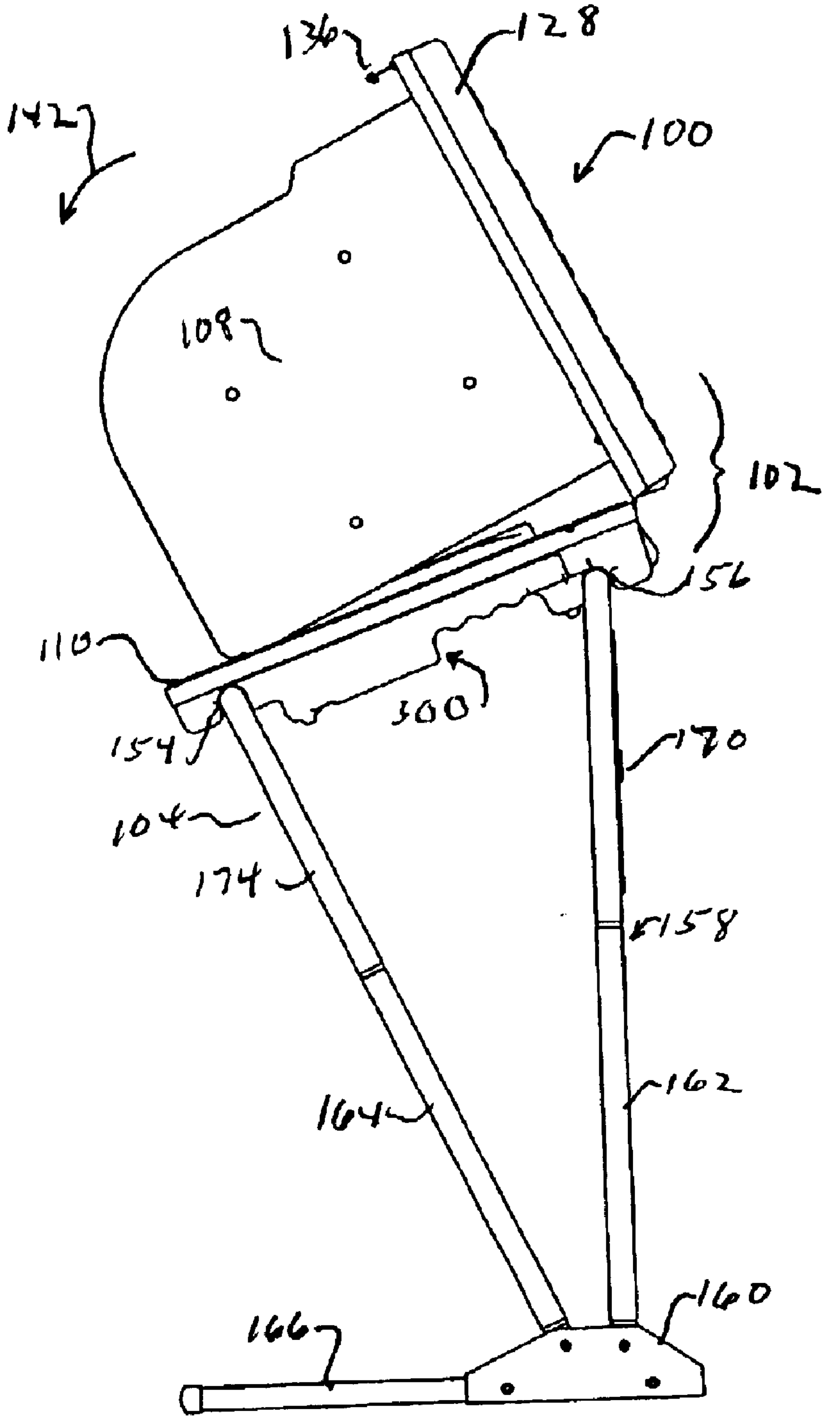
FIG. 3 is a right side view of the portable voting booth.

FIG. 3 is a side view that reveals a plurality of receptacles 300 formed in the bottom of lower shell 110. The receptacles 300 are complimentary to the disassembled components of the selectively disassemblable frame 104 such that the entirety of frame 104, in disassembled form, may be placed within the receptacles for retention during storage and transportation when the bivalve case 102 is pivoted into a closed configuration by movement in the direction of arrow 142.

The portable voting booth 100 is used by retrieving the booth 100 from storage, opening the bivalve case 102, positioning the privacy screens 106, 108 between the upper shell 128 and the lower shell 110 to impede unauthorized viewing of the electronic voting device 112 from side perspectives during the voting process, detaching the selectively disassemblable frame 104 from receptacles 300, assembling the frame 104 with the lower shell 110 to support the lower shell, and permitting voters to vote using the electronic voting device 112. At the conclusion of voting processes, the portable voting booth 100 may be disassembled by reversing the above steps and transported to storage.

Figure 4:
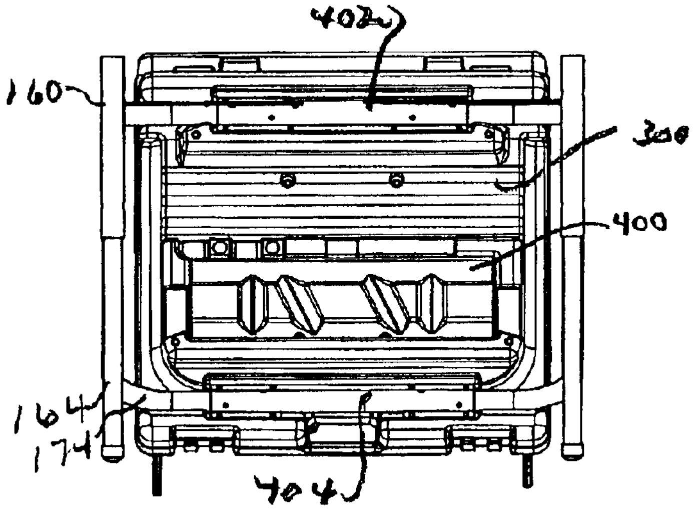
FIG. 4 is a bottom plan view of the portable voting booth showing disassembled components of the support frame in receptacles formed in the exterior wall of a bivalve case with the portable voting booth placed in condition for storage and transportation.

FIG. 4 shows, by way of example, various receptacles 300 formed in bottom surface 400 of the lower shell 110. The receptacles 300 have complimentary shapes with respect to the various disassembled components of frame 104 (shown assembled in FIG. 1), such as members 164 and 174, as well as foot bracket 160. As shown in FIG. 4, these components are all folded into a storage position from which, optionally, disassembled components may be detached for placement within the receptacles 300. The receptacles 300 have complimentary shapes with respect to the disassembled components for insertion and retention, which may be facilitated by clips or straps (not shown). Hinges 402, 404, permit pivoting of the components between the storage position shown in FIG. 4 and the extended position for operational use shown in FIGS. 1 and 3.

Those skilled in the art will appreciate that the instrumentalities which are described above may be subjected to minor modifications without departing from the scope and spirit of the invention. Accordingly, the inventors hereby state their intention to rely upon the Doctrine of Equivalents to protect their full rights in the scope of the invention.

We claim:

1. A portable voting booth comprising:

a bivalve case including a lower shell having an electronic voting device mounted thereon, an upper shell, and a coupler connecting the upper shell to the lower shell permitting pivotal motion of the upper and lower shells with respect to one another between an open configuration and a closed configuration;

a selectively disassemblable frame having a plurality of components; and the lower shell presenting a lower shell exterior surface and the upper shell presenting an upper shell exterior surface when the bivalve case is in the closed configuration, at least one of the lower shell exterior surface and the upper shell exterior surface forming a plurality of receptacles each having a complementary shape with respect to at least one of the plurality of components, the plurality of receptacles permitting retention of the plurality of components in corresponding ones of the receptacles during transportation and storage of the portable voting booth.

2. The portable voting booth as set forth in claim 1, further comprising a pair of privacy screens, each of the privacy screens being connected by a pivot to the upper shell to permit pivoting motion of the privacy screens along an arc between a first position folded against the upper shell and extended position away from the upper shell, the bottom shell and the pair of privacy screens, in combination, having means for retaining the privacy screens in the extended position, the upper shell and lower shell, when pivoted to meet one another in the closed configuration with the privacy screens in the folded position, form an internal compartment having sufficient dimensions to retain the electronic voting device and the privacy screens.

3. The portable voting booth as set forth in claim 1, wherein the bivalve case comprises a lock mechanism opposite the coupler to prevent unauthorized access to the electronic voting system when the bivalve case is in the closed configuration.

4. The portable voting booth as set forth in claim 1, wherein the selectively disassemblable frame in assembled condition comprises an open front facilitating access by persons who use wheelchairs.

5. The portable voting system as set forth in claim 1, wherein the frame comprises a plurality of tubular members coupled by telescoping clip latches.

6. The portable voting booth as set forth in claim 5, wherein selected portions of the receptacles accommodate corresponding portions of the tubular members and function to support the lower shell at the angle by virtue of contact with the corresponding portions.

7. The portable voting booth as set forth in claim 5, wherein the frame comprises a foot bracket that receives two generally upright members forming a triangle with the lower shell and a forward extending horizontal member that imparts stability against tipping by virtue of contact against the ground.

8. The portable voting booth as set forth in claim 1, comprising a pair of privacy screens selectively positionable between the upper shell and the lower shell to impede unauthorized viewing of the electronic voting device from side perspectives during voting process.

9. The portable voting booth as set forth in claim 1, wherein the selectively disassemblable frame is coupled with the lower shell to support the lower shell at an angle that facilitates authorized viewing of the electronic voting device during the course of voting processes.

10. A method of voting using the portable voting booth of claim 1, the method comprising the steps of:

from the closed configuration with the plurality of components inserted into the receptacles, opening the bivalve case;

detaching the plurality of components from the receptacles;

assembling the frame from the plurality of components attached to the lower shell; and permitting voters to vote using the electronic voting device.

11. The method as set forth in claim 10, wherein the step of assembling the frame comprises telescoping the disassembled portions into one another with clip latch retention in an assembled configuration.

12. The method as set forth in claim 10, further comprising a step of installing a pair of privacy screens between the upper shell and the lower shell to impede unauthorized viewing of the electronic voting device from side perspectives during the voting process.

13. A method of voting using the portable voting booth of claim 2, comprising the steps of:

from the closed configuration with the plurality of components inserted into the receptacles, opening the bivalve case;

detaching the plurality of components from receptacles;

assembling the frame from the plurality of components attached to the lower shell;

permitting voters to vote using the electronic voting device;

disassembling the frame into the plurality of components;

inserting the plurality of components into the receptacles for storage;

placing the privacy screens in the folded position; and closing the bivalve case with the privacy screens therein.

* * * * *